United States Patent [19]

van Hout et al.

[11] Patent Number: 4,731,778
[45] Date of Patent: Mar. 15, 1988

[54] ELECTRO-MAGNETIC DRIVE UNIT COMPRISING A PIVOTABLE ARMATURE

[75] Inventors: Henricus M. van Hout; Johannes T. A. van de Veerdonk, both of Eindhoven, Netherlands

[73] Assignee: U.S. Philips Corp., New York, N.Y.

[21] Appl. No.: 822,976

[22] Filed: Jan. 27, 1986

[30] Foreign Application Priority Data

Oct. 22, 1985 [NL] Netherlands ........................ 8502872

[51] Int. Cl.⁴ ........................... G11B 3/10; G11B 7/00
[52] U.S. Cl. .................................................. 369/266
[58] Field of Search .......................................... 369/266

[56] References Cited

U.S. PATENT DOCUMENTS

| | | | |
|---|---|---|---|
| 3,912,283 | 10/1975 | Hammond et al. ................. | 369/266 |
| 3,970,980 | 7/1976 | Nelson ................................. | 335/253 |
| 4,087,095 | 5/1978 | Koda .................................... | 369/266 |
| 4,194,743 | 3/1980 | Olsawa et al. ...................... | 369/266 |
| 4,403,316 | 9/1983 | Van de Veerdonk .............. | 369/222 |
| 4,620,301 | 10/1986 | Koide .................................. | 369/266 |

*Primary Examiner*—Steven L. Stephan
*Attorney, Agent, or Firm*—F. Brice Faller

[57] ABSTRACT

An electromagnetic drive unit comprises a stator (2) and an armature (4) which is pivotable about a pivotal axis (5) and which cooperates with the stator via an air gap. In order to minimize the volume and to obtain a maximum efficiency, the armature is arranged coaxially around the stator, the stator comprising at least two polepieces (6A) which are interconnected by a stator member (6B) carrying a coil (8). The armature comprises a plurality of radially magnetized poles (28A, 28B) which correspond in number to at least the number of polepieces, which poles are tangentially juxtaposed with alternately opposite polarities.

15 Claims, 4 Drawing Figures

ELECTRO-MAGNETIC DRIVE UNIT COMPRISING A PIVOTABLE ARMATURE

The invention relates to an electro-magnetic drive unit comprising a stator and an armature which is pivotable about a pivotal axis and which cooperates with said stator via an air gap.

The invention also relates to a pivotal-arm device for recording and/or reading record tracks in an optical disc by means of a radiation beam. The device includes a stationary frame, an optical scanning unit comprising a lens system which is movable along an optical axis, a pivotal arm which is supported in the frame to carry the optical scanning and an electro-magnetic drive unit for driving the pivotal arm so as to be pivotable in a plane transverse to said optical axis. The drive unit comprises a stator which is secured to the frame and an armature which is connected to the pivotal arm.

Such a pivotal-arm device is disclosed in European Patent Application EP No. 0,074,131 U.S. Pat. No. 4,403,316 corresponds (herewith incorporated by reference) and is provided with a drive unit of the above type.

In the known pivotal-arm device the optical scanning unit can perform a limited pivotal movement over the information surface of an optical disc. The movement is effected about a pivotal axis which extends parallel to the axis of rotation of the optical disc. The optical disc may be a video disc, an audio disc or a data-storage disc.

Optical-disc players provided with a pivotal-arm device generally include a focussing-control device and a tracking control device. The focussing-control device serves to ensure that a light spot emitted by a light source is automatically kept focussed on the information surface of the disc. The tracking device serves for automatically correcting deviations in the position of the light spot within the information plane and transverse to the direction of the information track. For this purpose the pivotal arm is included in an automatic control loop and is driven by the electromagnetic drive unit to correct tracking errors by means of pivotal movements of the pivotal arm.

In the known drive unit the stator comprises two permanent magnets having the shape of circular segments, which magnets are secured to an iron yoke and extend transversely of the pivotal axis of the armature. The armature comprises two cylindrical coils which are secured to the pivotal arm and which are movable through an axially oriented magnetic field in an air gap formed between the permanent magnets and a part of the yoke.

In a pivotal-arm device of the type defined in the foregoing it is important that the electromagnetic drive unit has such a power and torque that a detected deviation in the position of the light spot in the plane of the information surface of the optical disc can be corrected rapidly regardless of the instantaneous position of the pivotal arm relative to the disc. In the known drive unit this has resulted in comparatively large dimensions of the drive unit, in particular the diameter of the segment-shaped magnets, so that the drive unit occupies much space. For larger apparatus this does not present a problem, but currently there is a trend to construct at least specific optical-disc players in such a way that they are compact and light-weight, enabling them to be used as portable or built-in apparatus.

Further, the known drive unit has the disadvantage that the magnets must be made of high-quality and therefore expensive materials, such as samarium-cobalt, in order to meet the required motor specifications. This is mainly a consequence of the arrangement of the coils in the air gap between the magnets.

SUMMARY OF THE INVENTION

It is an object of the invention to provide an electromagnetic drive unit which in addition to excellent motor properties has a small volume, so that it is very suitable for use in advanced apparatuses and devices, such as pivotal-arm devices in optical-disc players.

To this end the stator has at least one pair of polepieces which are interconnected by a magnetisable stator member carrying at least one coil, and the armature has a cylindrical armature member arranged coaxially around the stator. The armature has a plurality of axially and tangentially extending radially magnetised poles which correspond in number to at least the number of stator polepieces and which are juxtaposed and have alternately opposite polarities viewed in the circumferential direction of said armature member. Each pole of the armature has tangentially opposed bounding surfaces, at least one of the bounding surfaces of each pole being juxtaposed with a respective bounding surface of the juxtaposed pole. The juxtaposed bounding surfaces are tangentially spaced at least substantially the same as the centers of the respective stator poles.

The drive unit combines a high efficiency with a small volume when the stator is dimensioned correctly. Moreover, this drive unit has a limited number of parts, allowing an easy-to-automate assembly of these parts.

The combination of the present steps with respect to the stator and distinct magnetic pole definition in the armature enable the driving torque of the drive unit to remain substantially constant as a function of the pivoting angle over a comparatively large pivoting angle. Moreover, if care is taken that the magnetic resistance of the polepieces is equal to the magnetic resistance of the stator member interconnecting the polepipes, the amount of magnetic energy in the stator will, in principle, not change when the armature is pivoted, so that the armature can assume an arbitrary position when the drive unit is not energised. This means that the armature has no preferred positions, which has substantial advantages, in particular with respect to the control of the drive unit.

Since the coils in the drive unit are arranged around the magnetisable stator member, a high efficiency can be achieved without the need to use high-quality magnetic materials.

A particularly suitable embodiment is characterized in that the pair of polepieces of the stator are diametrally arranged and together with said stator member constitute a double T-shaped stator element, the polepieces each having a cylindrically curved surface on the side facing the armature member.

A preferred embodiment which can be manufactured advantageously is characterized in that the armature member comprises a magnetisable ring and a permanent-magnetic annular magnet body arranged inside the ring and provided with poles.

The ring, which need not be closed entirely and which serves to return the magnetic flux, may be manufactured from soft-iron. It is important that the permanent-magnet body has a high degree of homogeneity and a radially oriented preferred magnetic direction.

Therefore, the magnet material is preferably an anisotropic material such as a plastoferrite.

Because of its special properties, the electromagnetic drive unit in accordance with the invention is particularly suitable for use wherein accurately defined rapidly reciprocating movements have to be performed, such as in a carburetor. However, the drive unit is particularly suitable for driving the pivotal arm of a pivotal-arm device of the type defined in the foregoing.

DETAILED DESCRIPTION OF THE PREFERRED EMBODIMENT

Figure 1:
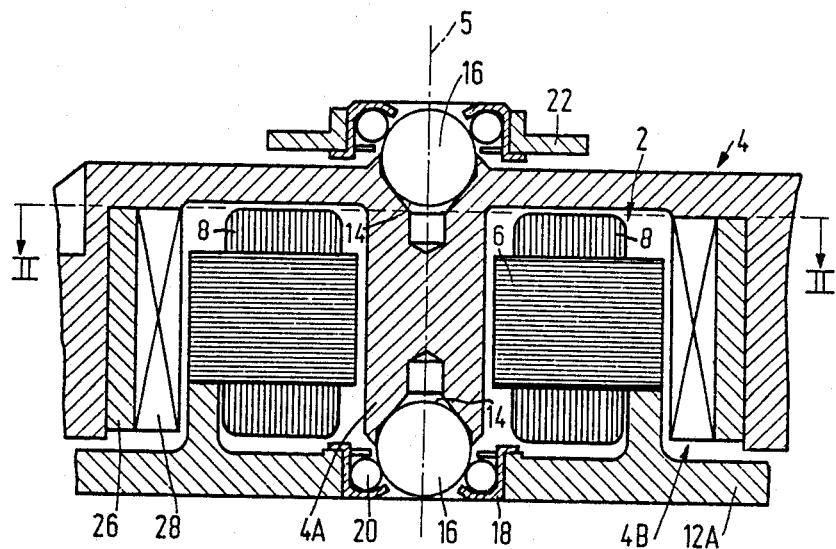
FIG. 1 is a longitudinal sectional view showing an electromagnetic drive unit in a first embodiment of the invention.
Figure 2:
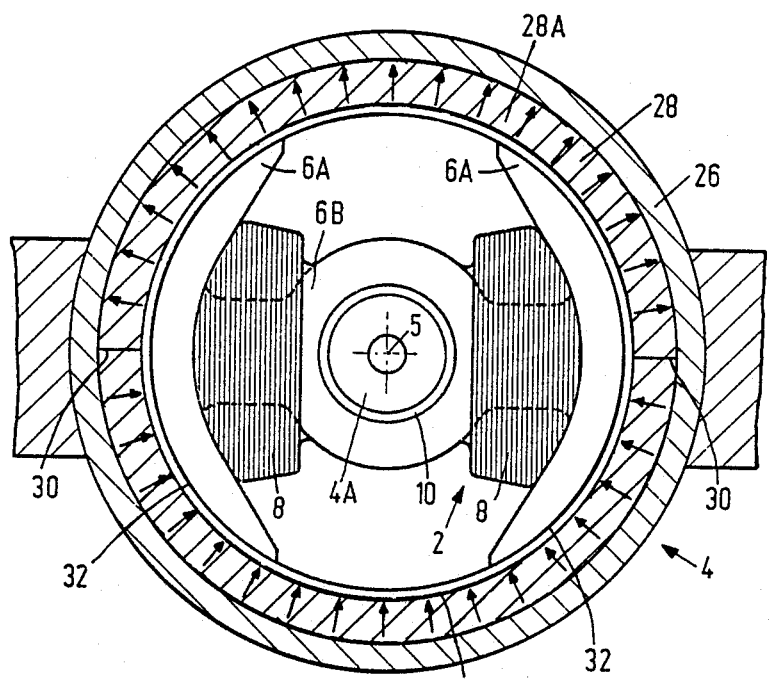
FIG. 2 is a sectional view of the drive unit taken on the lines II—II in FIG. 1.

The drive unit shown in FIGS. 1 and 2 comprises a stator 2 and an armature 4 mounted coaxially around the stator 2. The stator 2 comprises a double T-shaped stator element 6 and two coils 8 electrically arranged in series. The stator element 6, which is constructed as a lamination assembly, has two diametrally disposed polepieces 6A, and a stator member 6B interconnecting the pole-pieces 6A. In the stator member 6B a central opening 10 is formed for the passage of the armature spindle 4A of the armature 4. The coils 8 are wound around a portion of the stator member 6B which is situated between the central opening 10 and the polepieces 6A. The stator 2 is secured to a frame plate 12A by means of for instance an adhesive.

Spindle 4A serves to provide the pivotal movment of the armature 4 relative to the stator 2 about a pivotal axis 5. For this purpose the armature spindle 4A has recesses 14 in two end portions, in which recesses a ball 16 engages with a moderately tight fit. In the frame plate 12A opposite one of the ends of the armature spindle 4A a bearing race 18 with balls 20 is mounted and rotatably supports one of the balls 26. At the other end of the armature spindle 4A a similar bearing race 18 with balls 20 is arranged. This bearing race 18 extends through a resilient member 22 which by means of bolts 24 is secured with a specific pretension to a constructional member connected to the deck plate 12A (see also FIG. 3), so that the armature 4 is supported without play. When the armature 4 is mounted care must be taken that the pivotal axis 5 of the armature 4 coincides exactly with the central axis of the stator 2.

The armature 4 further comprises a cylindrical armature member 4B comprising a soft-iron ring 26 and an annular permanent magnet 28 of an anisotropic material, for example a plastoferrite, which is glued inside the ring. The magnet 28, which is radially magnetised, has two poles 28A and 28B of opposite polarity. In FIG. 2 the direction of magnetisation of the poles 28A and 28B, which each cover 180° in a circumferential direction, is indicated by means of arrows. The stator 2 and the armature 4 are positioned in such a way relative to each other that in the central position of the armature 4 the bounding surfaces 30 between the poles 28A and 28B are situated in a plane which coincides with the plane of symmetry of the stator 2 which extends through the polepieces 6A perpendicularly to the cross-sectional view of FIG. 2.

Between the polepieces 6a of the stator 2, which have cylindrically curved surfaces at their sides facing the magnet 28, and the poles 28A and 28B of the armature 4 an air gap 2 is formed in which a radially directed magnetic field exists.

By suitably dimensioning the electromagnetic drive unit 1, in particular the stator member 6, preferred positions of the armature 4 can be avoided, so that in principle the armature can assume any arbitrary position when the coils 8 are not energised. When the coils are energised the armature 4 will perform a pivotal movement about the pivotal axis 5, in a direction which depends on the direction of the current in the coils. In the present embodiment the armature 4 can pivot clockwise and anticlockwise through an angle of 37° out of its central position without the driving torque changing significantly during this movement.

The drive unit is suitable for use in equipment of various types in which limited rotational or reciprocating movements have to be performed. The drive unit described here can be used in an optical disc player equipped with a pivotal-arm device for optically reading and recording record tracks in an optical disc.

Figure 3:
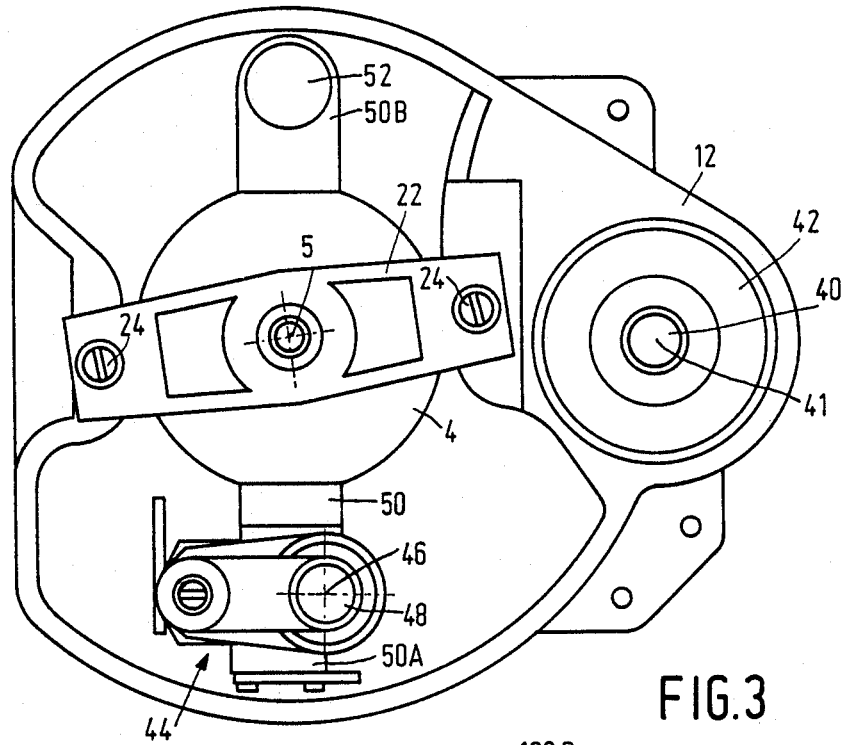
FIG. 3 is a plan view of a pivotal-arm device in accordance with the invention employing the drive unit shown in FIG. 1.

The pivotal-arm device of FIG. 3 is intended for use in a player by means of which an optical audio disc (compact disc) having a diameter of approximately 120 mm. The pivotal-arm device comprises a frame 12 in which a spindle 40 with a supporting surface 42 for the optical disc is journalled. The spindle 40 is driven about an axis of rotation 41 by means of an electric motor which, like the optical disc, is not shown. The optical disc is read in reflection by means of an optical scanning unit 44 comprising a lens system 48 which is movable along an optical axis 46. The optical scanning unit 44 is mounted in a pivotal arm 50 of the pivotal-arm device. The scanning unit 44 may comprise a semiconductor laser as a light source and optical and opto-electronic means necessary for reading and processing the optical information read from the disc.

The pivotal arm 50 has a first end 50A with securing means for the optical scanning unit and a second end 50B carrying a counter-weight. For radially moving the scanning unit 44 relative to the optical disc the pivotal arm 50 is secured to the electromagnetic drive unit and is thus pivotable about the pivotal axis 5 of the armature 4. The drive unit itself is secured to the frame 12 by its frame plate 12A. This may be effected by means of an adhesive or by screwthread means. However, it is alternatively possible to manufacture the frame plate 12A and the frame 12 integrally, for example by injection-moulding, so that a further reduction of the number of parts and a reduction of the assembly time can be obtained. For the sake of completeness it is to be noted that the axis of rotation 41 of the spindle 40, the pivotal axis 5 of the pivotal arm 50 and the optical axis 46 of the lens system 48 extend parallel to one another.

Figure 4:
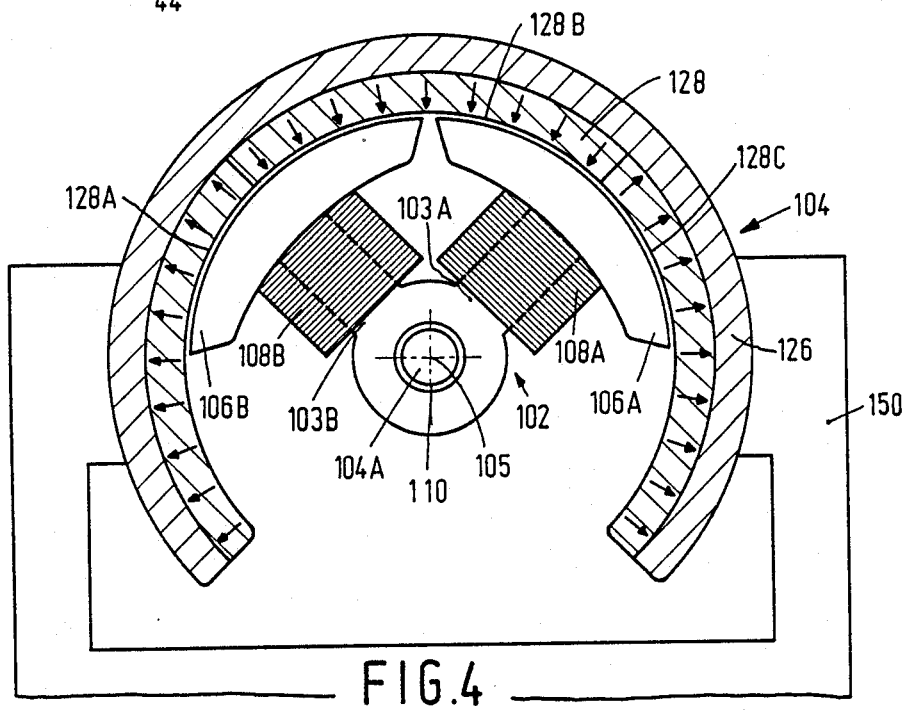
FIG. 4 is a cross-sectional view of the drive unit in a second embodiment of the invention.

FIG. 4 is a schematic representation of an alternative drive unit, which includes a stator 102 having two stator-element portions 103A and 103B which extend transversely of each other and which are interconnected. The portions 103A and 103B carry polepieces 106A and 106B respectively and coils 108A and 108B respectively. The stator 102 further has an opening 110 for the passage of an armature spindle 104A. The armature spindle 104A forms part of cylindrical armature 104 mounted coaxially around the stator 102. When the coils 108A and 108B are energised the armature 104 can pivot about axis 105. For this purpose the armature 104 comprises a cylindrical magnet 128 which is spaced at a small distance from the polepieces 106A and 106B and which is magnetised radially so that three poles 128A, 128B and 128C face the polepieces. The poles 128A, 128B and 128C are magntized as indicated by means of arrows. In order to close the magnetic circuit when the coils 108A and 108B are energised the armature 104 include a soft-iron member 126 in the form of a cylindrical segment against whose inner side the magnet 128 is arranged. As a result of the asymmetrical shape of the stator 102, a cylindrical segment can be removed from the magnet 128 and the soft-iron member 126 without the operation of the actuating unit being affected significantly. The armature 104 can be secured to a pivotal arm 150 of the pivotal-arm device, not shown. The dimensions of the polepieces 106A and 106B and of the magnet 128 enable a 90° pivotal. As a result of its asymmetrical construction the present embodiment is particularly suitable for use in cases where only a limited space for the drive unit is available.

Other constructions based on the inventive principle are possible. For example, it is possible to provide the electromagnetic drive unit with two pairs of polepieces in combination with four poles. Such a construction is particularly suitable where a large driving torque is required but the armature need only be pivotable through a comparatively small pivoting angle.

What is claimed is:

1. An electromagentic drive unit comprising a stator and an armature which is pivotable about a pivotal axis and which cooperates with a stator via an air gap, characterized in that
    the stator comprises at least one pair of polepieces having respective centers which are interconnected by a magnetizable stator member carrying at least one coil, and
    the armature comprises a cylindrical armature member which is arranged coaxially around the stator, which armature has a plurality of axially and tangentially extending radially magnetized poles which correspond in the number at least to the number of stator polepieces and which are juxtaposed and alternately have opposite polarities viewed in the circumferential direction of said armature member, said poles cooperating with said polepieces via said air gap, each pole of said armature having tangentially opposed bounding surfaces, at least one of said bounding surfaces of each pole being juxtaposed with a respective bounding surface of the juxtaposed pole, said juxtaposed bounding surfaces being tangentially spaced at least substantially the same as the centers of the respective stator poles.

2. A drive unit as claimed in claim 1, characterized in that the pair of polepieces of the stator are diametrically opposed and together with said stator member constitute a double T-shaped stator element, the polepieces each having a cylindrically curved surface facing the armature.

3. A drive unit as claimed in claim 2, characterized in that the armature member comprises a magnetisable ring and a permanent-magnetic annular magnet body which is arranged on the inside of the ring and which is provided with said poles, the bounding surfaces of each pole being 180° apart.

4. A pivotal-arm device for recording and/or reading record tracks in an optical disc by means of a radiation beam, comprising
    a stationary frame,
    an optical scanning unit comprising a lens system which is movable along an optical axis,
    a pivotal arm which is supported in the frame to carry the optical scanning unit,
    an electromagnetic drive unit for driving the pivotal arm so as to be pivotable in a plane transverse to said optical axis, which drive unit comprises a stator which is secured to the frame and an armature which is connected to the pivotal arm, characterized in that the electromagnetic drive unit is a unit as claimed in claim 3.

5. A drive unit as claimed in claim 1, characterized in that the armature member comprises a magnetisable ring and a permanent-magnetic annular magnet body which is arranged on the inside of the ring and which is provided with said poles, the bounding surfaces of each pole being 180° apart.

6. A pivotal-arm device for recording and/or reading record tracks in an optical disc by means of a radiation beam, comprising
    a stationary frame,
    an optical scanning unit comprising a lens system which is movable along an optical axis, an electromagnetic drive unit
    for driving the pivotal arm so as to be pivotable in a plane transverse to said optical axis, which drive unit comprises a stator which is secured to the frame and an armature which is connected to the pivotal arm,
characterized in that the electromagnetic drive unit is a unit as claimed in claim 5.

7. A pivotal-arm device for recording and/or reading record tracks in an optical disc by means of a radiation beam, comprising
    a stationary frame,
    an optical scanning unit comprising a lens system which is movable along an optical axis, an electromagnetic drive unit
    for driving the pivotal arm so as to be pivotable in a plane transverse to said optical axis, which drive unit comprises a stator which is secured to the frame and an armature which is connected to the pivotal arm,
characterized in that the electromagnetic drive unit is a unit as claimed in claim 2.

8. A pivotal-arm device for recording and/or reading record tracks in an optical disc by means of a radiation beam, comprising
    a stationary frame,
    an optical scanning unit comprising a lens system which is movable along an optical axis, an electromagnetic drive unit
    for driving the pivotal arm so as to be pivotable in a plane transverse to said optical axis, which drive unit comprises a stator which is secured to the frame and an armature which is connected to the pivotal arm,
characterized in that the electromagnetic drive unit is a unit as claimed in claim 1.

9. An electromagnetic drive circuit as in claim 1 wherein there is a discrete coil for each polepiece.

10. A pivotal-arm device for recording and/or reading record tracks in an optical disc by means of a radiation beam while said disc rotates about an axis, said device comprising a stationary frame, an optical scanning unit comprising a line system which is movable along an optical axis, a pivotal arm which is supported in the frame to carry the optical scanning unit, said pivotal arm pivoting about a pivotal axis which extends parallel to the axis of rotation of the optical disc, an electromagnetic drive unit comprising a stator which is fixed to said frame and an armature which is fixed to said pivotal arm, said stator comprising a magnetizable stator member and at least one pair of polepieces having respective centers which are interconnected by said stator member, said stator member carrying at least one coil, said armature comprising a cylindrical armature member which is arranged coaxially around the stator, and a plurality of axially and tangentially extending radially magnetized poles which correspond in number at least to the number of stator polepieces, said poles being juxtaposed and alternately having opposite polarities viewed in the circumferential direction of the armature member, said poles cooperating with said polepieces via an air gap each pole of said armature having tangentially opposed bounding surfaces, at least one of said bounding surfaces of each pole being juxtaposed with a respective bounding surface of the juxtaposed pole, said juxtaposed bounding surfaces being tangentially spaced at least substantially the same as the centers of the respective stator poles.

11. A pivotal arm device as in claim 10 wherein the pair of polepieces are diametrically opposed and together with said stator member constitute a double T-shaped stator element, the polepieces each having a cylindrically curved surface facing the armature.

12. A pivotal arm device as in claim 10 wherein the armature member comprises a magnetizable ring and an annular permanent magnet arranged inside the ring and provided with said poles, the bounding surfaces of each pole being 180° apart.

13. A pivotal arm device as in claim 10 wherein the armature member comprises a magnetizable ring segment and an annular permanent magnet ring segment arranged therein and provided with said poles.

14. A pivotal arm device as in claim 13 wherein the stator has but two polepieces and the armature has but three poles.

15. A pivotal arm device as in claim 10 wherein there is a discrete coil for each polepiece.

* * * * *